(12) United States Patent
Zeng

(10) Patent No.: US 9,778,721 B2
(45) Date of Patent: Oct. 3, 2017

(54) METHOD AND DEVICE FOR MONITORING POWER CONSUMPTION OF APPLICATION IN ANDROID TERMINAL

(75) Inventor: Huipeng Zeng, Shenzhen (CN)

(73) Assignee: XI'AN ZHONGXING NEW SOFTWARE CO. LTD., Xi'an (CN)

( * ) Notice: Subject to any disclaimer, the term of this patent is extended or adjusted under 35 U.S.C. 154(b) by 591 days.

(21) Appl. No.: 14/241,077

(22) PCT Filed: Feb. 23, 2012

(86) PCT No.: PCT/CN2012/071530
§ 371 (c)(1),
(2), (4) Date: Feb. 25, 2014

(87) PCT Pub. No.: WO2013/029355
PCT Pub. Date: Mar. 7, 2013

(65) Prior Publication Data
US 2014/0173319 A1    Jun. 19, 2014

(30) Foreign Application Priority Data

Aug. 31, 2011    (CN) .......................... 2011 1 0255572

(51) Int. Cl.
*G06F 1/32* (2006.01)
*G06F 11/30* (2006.01)
*G06F 11/34* (2006.01)

(52) U.S. Cl.
CPC ........ *G06F 1/3206* (2013.01); *G06F 11/3013* (2013.01); *G06F 11/3062* (2013.01);
(Continued)

(58) Field of Classification Search
CPC ............... G06F 1/3206; G06F 11/3013; G06F 11/3062; G06F 11/3409; G06F 11/3466; G06F 2201/865; Y02B 60/165
(Continued)

(56) References Cited

U.S. PATENT DOCUMENTS 7,260,487 B2    8/2007    Brey
2003/0191791 A1    10/2003    Cyran
(Continued)

FOREIGN PATENT DOCUMENTS

CN    1975692 A    6/2007
CN    101611364 A    12/2009
(Continued)

OTHER PUBLICATIONS

Supplementary European Search Report in European application No. 12827860.3, mailed on Jun. 30, 2015.
(Continued)

*Primary Examiner* — Ricky Ngon
(74) *Attorney, Agent, or Firm* — Neifeld IP Law, P.C.

(57) ABSTRACT

The disclosure provides a method for monitoring power consumption of an application in an Android terminal, including that: a behavior of an application is captured via a preset monitoring point; data on power consumption of the behavior of the application are collected; and the power consumption of the application is analyzed according to the data on power consumption, and the result of the analysis is displayed on an Android terminal. The disclosure also provides a corresponding device. With the method and device for monitoring power consumption of an application in an Android terminal, a problem of increased power consumption of an Android terminal caused by a behavior of an application is solved.

2 Claims, 6 Drawing Sheets

(52) U.S. Cl.
CPC ...... *G06F 11/3409* (2013.01); *G06F 11/3466* (2013.01); *G06F 2201/865* (2013.01); *Y02B 60/165* (2013.01)

(58) Field of Classification Search
USPC .......................................................... 702/60
See application file for complete search history.

(56) References Cited

U.S. PATENT DOCUMENTS

| | | |
|---|---|---|
| 2007/0124094 A1 | 5/2007 | Brey |
| 2011/0072292 A1 | 3/2011 | Khawand |
| 2011/0191609 A1* | 8/2011 | Van Bokhoven ..... G06F 1/3206 713/310 |

FOREIGN PATENT DOCUMENTS

| | | |
|---|---|---|
| CN | 101727172 A | 6/2010 |
| CN | 101916220 A | 12/2010 |
| CN | 102306118 A | 1/2012 |

OTHER PUBLICATIONS

Accurate Online Power Estimation and Automatic Battery Behavior Based Power Model Generation for Smartphones, mailed on Oct. 24, 2010.

English Translation of the Written Opinion of the International Search Authority in international application No. PCT/CN2012/071530 , mailed on May 3, 2012.

International Search Report in international application No. PCT/CN2012/071530 , mailed on May 3, 2012.

\* cited by examiner

METHOD AND DEVICE FOR MONITORING POWER CONSUMPTION OF APPLICATION IN ANDROID TERMINAL

TECHNICAL FIELD

The disclosure relates to technology of terminals, and in particular to a method and device for monitoring power consumption of an application in an Android terminal.

BACKGROUND

Power consumption has always been a key technical indicator of major concern in a smart mobile equipment, as the quality of power consumption directly decides the core competitiveness of a smart mobile product.

Power consumption may be optimized with respect to a hardware, a drive, a system software or an application. Before an Android terminal product leaves a factory, an equipment manufacturer will optimize the power consumption thereof with respect to the hardware, drive and system software to achieve optimal balance between performance and the power consumption. However, the power consumption of an application can not be controlled, and a user often finds that after a large number of applications are installed on an Android terminal, standby time drops dramatically.

Latest data show that the number of free Android applications has reached 134,000. Although user experience may be greatly enriched and expanded with the increasing number of free applications, at runtime such free applications may cause dramatic increase in the power consumption of the Android terminal of a user due to, during programming and development of some unsupervised free softwares, mere consideration in functionality thereof at the cost of software and hardware resources.

For example, codes of many free games are executed with low efficiency, leading to long-term 100% operation of CPU resources without entering an energy-saving idle state when a user plays such a game. Furthermore, some applications will hold a sleep lock of an Android system for a long time to avoid disconnection, such that the system cannot get into a sleep mode when the system is idle; or some applications access a wireless network such as WIFI (Wireless Fidelity), BT (Bluetooth), 3G, etc., without the awareness of the user, such that a radio-frequency (RF) module with high power consumption is in a high-load state frequently. All these situations will result in dramatic deterioration in power-consumption performance, thereby reducing standby time of the battery of the whole terminal.

SUMMARY

In view of the above, it is desired that the disclosure provides a method and device for monitoring power consumption of an application in an Android terminal to solve the problem of increased power consumption of an Android terminal caused by a behaviour of an application.

The disclosure provides a method for monitoring power consumption of an application in an Android terminal, including that:

a behaviour of an application is captured via a preset monitoring point;

data on power consumption of the behaviour of the application are collected; and the power consumption of the application is analyzed according to the data on power consumption, and the result of the analysis is displayed on an Android terminal.

According to an embodiment, the method may further include that: after the step of displaying the result of the analysis on an Android terminal, an application that meets a preset warning rule is warned.

According to an embodiment, the method may further include that: before the step of capturing a behaviour of an application via a preset monitoring point, the monitoring point for capturing the behaviour of the application is set.

According to an embodiment, the power consumption of the application may be analyzed according to the data on power consumption by:

sorting and retrieving the data on power consumption; and performing statistics on the sorted and retrieved data on power consumption.

According to an embodiment, the step of performing statistics on the sorted and retrieved data on power consumption may specifically include:

accepting a setting for application-power-consumption statistics via a user interface; and performing statistic logic calculation according to the setting.

The disclosure further proposes a device for monitoring power consumption of an application in an Android terminal, including:

a capturing module configured to capture a behaviour of an application via a preset monitoring point;

a collecting module configured to collect data on power consumption of the behaviour of the application; and an analyzing module configured to analyze the power consumption of the application according to the data on power consumption, and display the result of the analysis on an Android terminal.

According to an embodiment, the device may further include:

a warning module configured to warn an application that meets a preset warning rule.

According to an embodiment, the device may further include:

a setting module configured to set the monitoring point for capturing the behaviour of the application.

According to an embodiment, the analyzing module may include:

a data digging unit configured to sort and retrieve the data on power consumption; and a UI unit configured to perform statistics on the sorted and retrieved data on power consumption.

According to an embodiment, the UI unit may include:

a UI setting subunit configured to accept a setting for application-power-consumption statistics via a user interface; and a statistics subunit configured to perform statistic logic calculation according to the setting.

The disclosure provides a method and device for monitoring power consumption of an application in an Android terminal, by setting a monitoring point, monitoring a behaviour of an application within an Android terminal, and analyzing and processing the monitored data, deterioration in power-consumption performance of the Android terminal caused by application behaviours is controlled effectively, thereby improving user experience.

DETAILED DESCRIPTION

Implementation and functional characteristics and advantages of the disclosure will be further described with reference to embodiments and accompanying drawings. It should be understood that the specific embodiments are only used to interpret the disclosure instead of limiting the disclosure.

Figure 1:
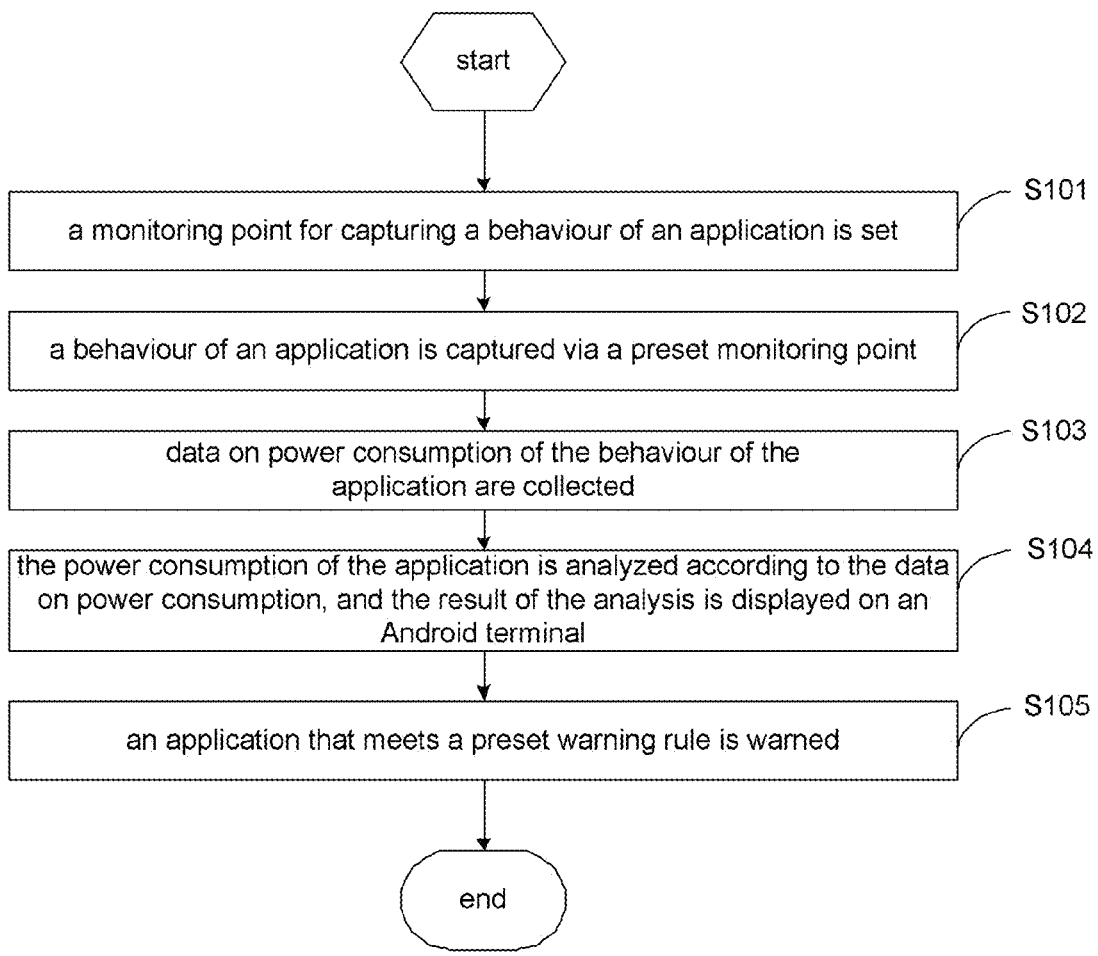
FIG. 1 is a flow chart of a method for monitoring power consumption of an application in an Android terminal according to the disclosure.

Proposed with reference to FIG. 1 is an embodiment of a method for monitoring power consumption of an application in an Android terminal according to the disclosure, including the steps as follows.

S101: a monitoring point for capturing a behaviour of an application is set.

A monitoring point is an underlying data source for monitoring the power consumption of an application, and each monitoring point needs to know the behaviour, PID (Process ID), and duration of an application being monitored currently.

A type of monitoring points mainly serve to monitor CPU occupancy, seizing of a sleep lock, (mobile) phone service, interface-being-on-top, network usage, screen starting, WIFI usage, BT usage, APN (Access Point Name) usage, and/or GPS (Global Position System) usage. As each behaviour monitored by a monitoring point is service logic of a system core, monitoring should be implemented by modifying a code of a framework of an Android system.

A weight for each monitoring point may be defined by related R&D (research and development) personnel according to increase or decrease in a current caused by a behaviour at each monitoring point during an actual development. For example, increase in power consumption due to CPU being in a state of idle or in 100% operation for a period of time, and increase in power consumption due to the system being awake for a long time, are compared with each other, and a greater weight is allocated for a corresponding monitoring point for which ever increase that is greater.

S102: a behaviour of an application is captured via a preset monitoring point.

Figure 2:
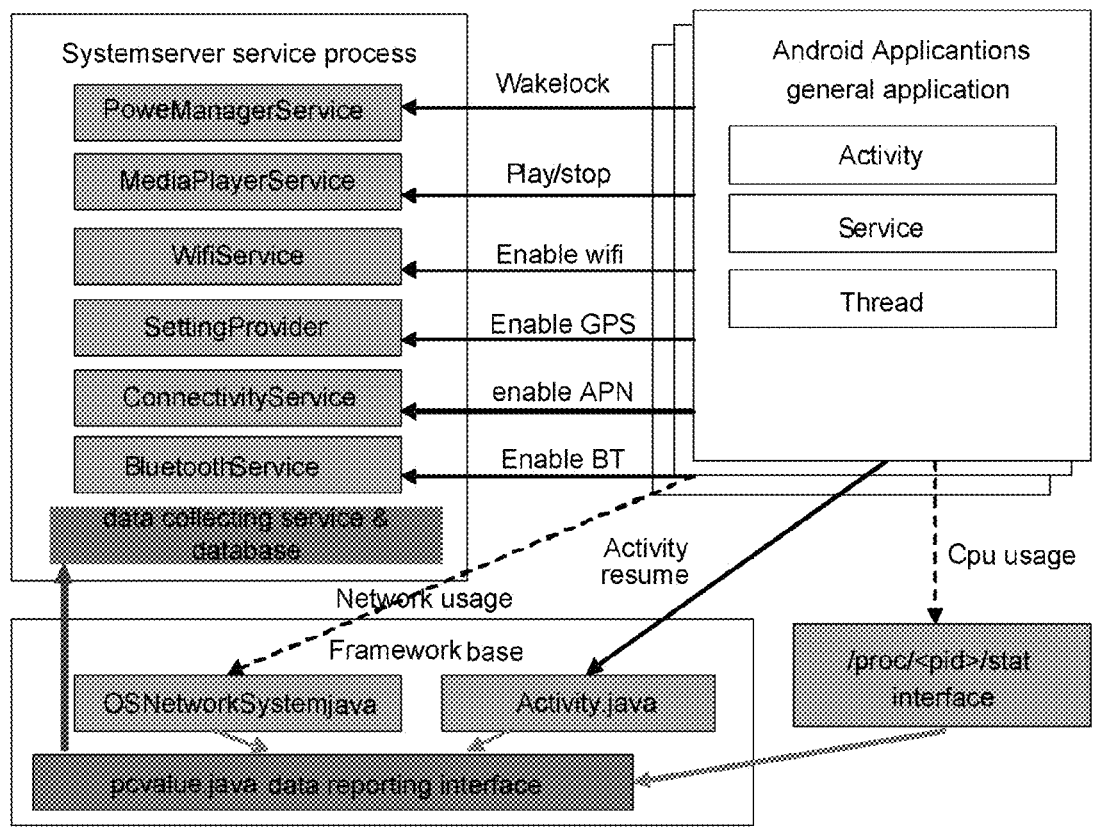
FIG. 2 is a schematic diagram of capturing a behaviour of an application in the method for monitoring power consumption of an application in an Android terminal according to the disclosure.

In order to monitor various power-consuming behaviours of an application, some behaviour-capturing codes aiming at the various behaviours are to be placed within the framework of the Android system. As shown in FIG. 2, a specific monitoring point functions as follows.

(1) a PowerManagerService may capture a time point when any application holds or releases a sleep lock, and is a power management service of the Android system; a monitoring point set here may capture the time when each application obtains or releases the sleep lock.

(2) each key service located at a systemserver process is monitored, wherein a MediaPlayerService captures the behaviour of media playing;

a WifiService captures the behaviour of turning on or off the WIFI;

a SettingProvider captures the behaviour of turning on or off the GPS;

a ConnectivityService captures the behaviour of connecting or disconnecting an APN network; and a BluetoothService captures the behaviour of turning on or off the BT.

(3) monitoring is added in a base class used by an application, wherein an OSNetworkSystem.java is a base class for TCP (Transmission Control Protocol) connection of an application, and monitors the network flow of the application; and an Activity.java is a base class for all Activity interfaces of an application, and may monitor display and hide of the application, such that the frequency of foreground usage of the application may be obtained.

(4) a further monitoring point may be an exposed proc port of a Linux operating system /proc/<pid>/stat, which may obtain the time of the CPU being occupied by each application.

S103: data on power consumption of the behaviour of the application are collected.

A data collecting service and a database mainly serve for data preserving and data digging. After a monitoring point is set and required key data are obtained, a unified data reporting interface is required to help each monitoring point send the monitored data into the data collecting service and the database. As monitoring-point implementing codes are scattered in java files of each corner of the system, in order to allow all data to access the data reporting interface, it is required that a java code of the data reporting interface is implemented in a source code of the framework. As shown in FIG. 2, implemented at pcvalue.java, where the data reporting interface is located, is mainly a port for the following function:

public static boolean InsertPowerConsumptionRecored (Context mRemoteContext, String ComponentName, // name of a monitored application String PkgName, // a package name of the monitored application int PID, // PID of the monitored application int TID, // TID of the monitored application long timeinms, // duration of a monitored behaviour String Action, int args) // the monitored behaviour and a parameter Besides providing one standard interface for connecting each monitoring point to the data collecting service, the data reporting interface is further required to take care of some performance optimization. A typical demand is to put a reporting request of each monitoring point into a separate thread to queue for execution, such that the request of the monitoring point may be returned immediately so as to avoid any adverse impact on traffic at a UI (User Interface).

In order to receive, across processes, data from each application process reported via the data reporting interface by each monitoring point, the data collecting service may be designed to be a Data Provider, which is one of the basic functions of the Android system; a Data Provider may run in any process and provides a set of data accessing interfaces, which are accessed across processes by another data accessing client via a binder mechanism. In a specific implementation, the data collecting service and the database are designed to run in a Systemserver process, and thus will not be limited by a memory management program as running in another general application.

The data collecting service and the database consist of sub-modules as follows.

(a) a Data Provider interface: an Android Data Provider works through a series of standard interfaces, which may work with the addition of specific implementation codes, wherein the most important is an insert interface, which receives data sent from the data reporting interface, and included in initialValues are a name, a behaviour, and an operating time of an application, and the like. Implementation of a public Uri insert (Uri uri, ContentValues initialValues) function is to transform the data in the initialValues into an sql instruction for operating the database mentioned below and insert the instruction into a table related to the data.

(b) a database: a built-in data base of the Android system is a lightweight but fully functional database sqlite, which supports standard SQL (Structured Query Language) grammar and is configured here to store data reported from an application; this database establishes a data table for each monitoring point, and data reported by each monitoring point enter a corresponding data table automatically for easy retrieval. The whole database exists in the form of db files, and supports backup and offline access.

(c) a backup service: the database performs a backup in every charging-discharging cycle, wherein a backup file is a db file as a history record for easy query.

S104: the power consumption of the application is analyzed according to the data on power consumption, and the result of the analysis is displayed on an Android terminal.

Figure 3:
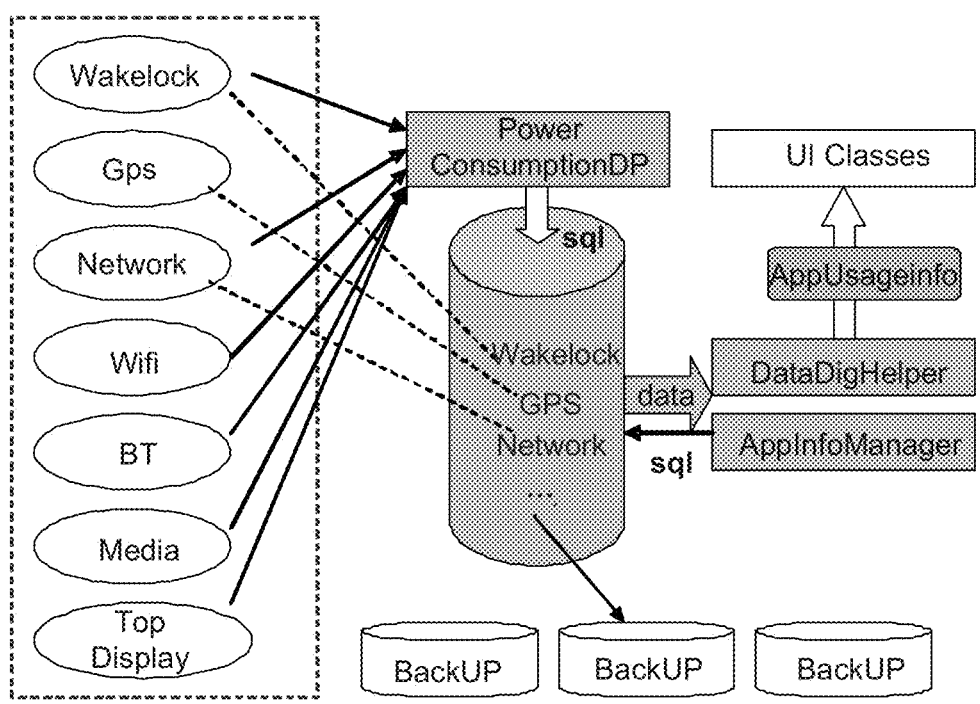
FIG. 3 is a schematic diagram of a data collecting service in the method for monitoring power consumption of an application in an Android terminal according to the disclosure.

First, data digging is performed. Sorting and sophisticated retrieving of data are implemented to reduce the complexity of data analysis at a client. As shown in FIG. 3, UI classes index data from data in the sqlite via a DataDigHelper. By adding various conditions, various statistical data, such as statistics on monitoring points or applications with heavy power consumptions in a period of time, may be obtained according to the setting at a UI, logic calculation may be implemented, and a simple interface may be exported. The DataDigHelper implements data digging, and dug data are packaged in an AppUsageinfo class.

Figure 4:
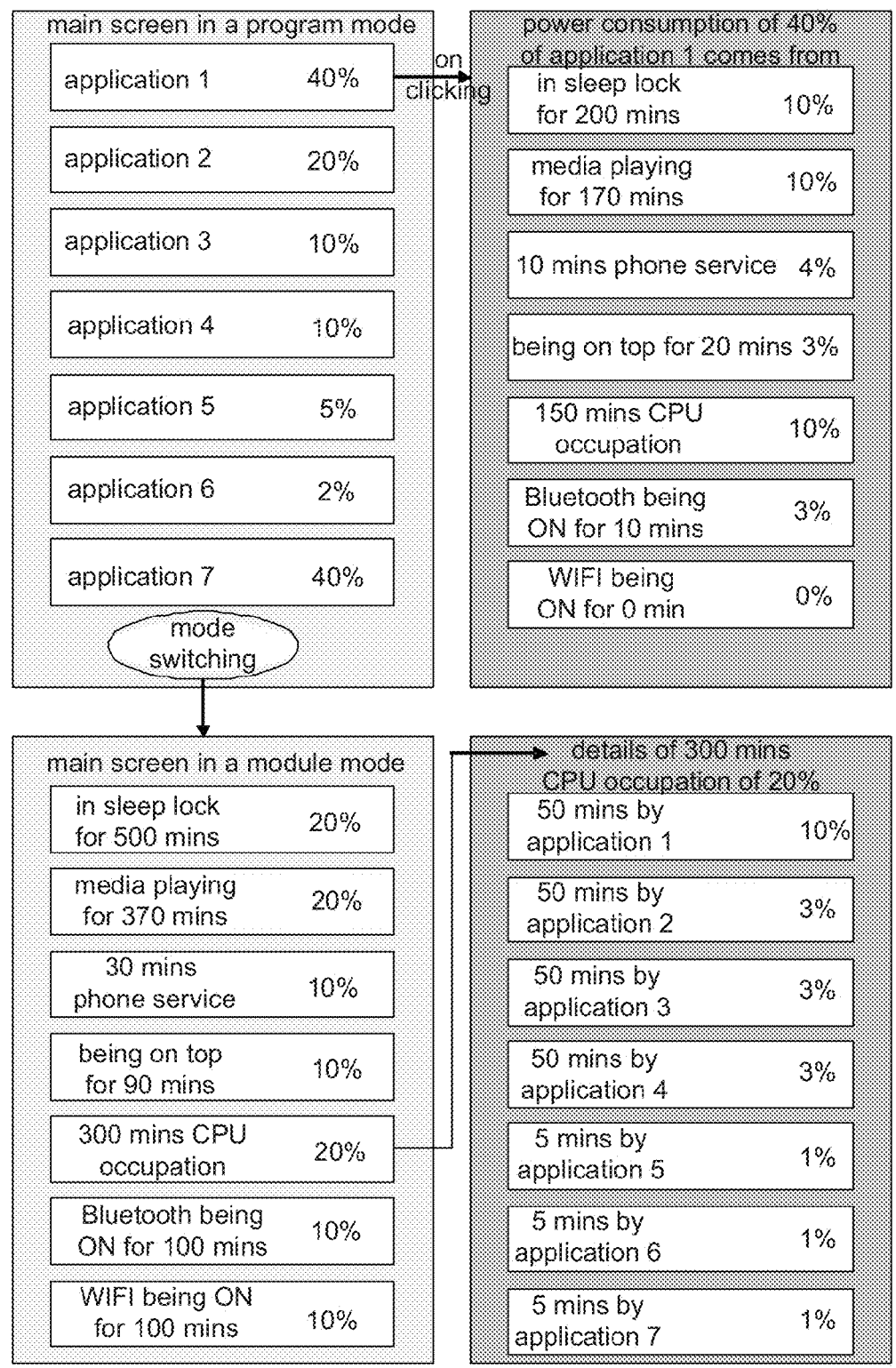
FIG. 4 is a schematic diagram of a user interface (UI) in the method for monitoring power consumption of an application in an Android terminal according to the disclosure.

Next, the UI parses the data obtained by the data digging to a graphical interface, and by analysis, data dug time after time may be displayed before a user quite visually. The UI provides a visual interface for implementing functions such as statistics of power consumption of each application, detail analysis, and a warning setting. To facilitate the user simplifying the analysis of power consumption of the Android terminal, the UI has to support a convenient view for retrieval to facilitate the user finding a program and a service to be forced to stop or to be uninstalled from a list of all programs. In order to enable the user to find an application with too much power consumption timely before battery depletion, this module supports a warning setting by the user, by which the user may set that a warning is given when an application holds the sleep lock continuously for longer than a period of time, or when total power consumption of an application within a period of time exceeds a preset threshold; the above settings may allow the user to filter out some applications which are not commonly used but seriously affect the power consumption according to a practical need. FIG. 4 illustrates a logic structure for data statistics, wherein an application with abnormal power may be found from multiple perspectives such as in an application mode or in a module mode.

S105: an application that meets a preset warning rule is warned.

A warning system is a service running in the background, is independent of the UI, and monitors a system event and a behaviour of an application. The user may set a warning option via the UI, a background warning server monitors the behaviour of each application in real time according to the warning setting of the user; once there is a threshold-surpassing behaviour, a warning message is sent to prompt the user to close or uninstall a related application to avoid accidental battery depletion.

In implementation, the warning system may be bundled with a mobile data service, or be made as an independent service of the Android system. The warning system mainly provides a monitoring thread in which a condition set via the UI by the user is determined, thereby implementing monitoring of different situations. When an abnormal behaviour meeting a warning setting is found, a warning message may be reported to the UI by way of intend; the UI is responsible for feedback to the user in the form of a dialog box.

For example, once the user sets to find an application that keeps the system from falling asleep 10 minutes after the mobile entering an idle state, the warning system will keep monitoring an event of screen-going-dark following cease of key-pressing and screen-touching, and will activate a warning program 10 minutes after occurrence of such an event.

For another example, when the user sets to watch for an application with a long-term CPU occupancy of more than 50%, the warning system performs statistics of time of CPU occupancy by each application periodically to find an application occupying the CPU for more than 50% of the time, and report the found application to the UI.

In this embodiment, by setting a monitoring point, monitoring a behaviour of an application within an Android terminal, and analyzing and processing the monitored data, deterioration in power-consumption performance of the Android terminal caused by application behaviours is controlled effectively, thereby improving user experience.

Figure 5:
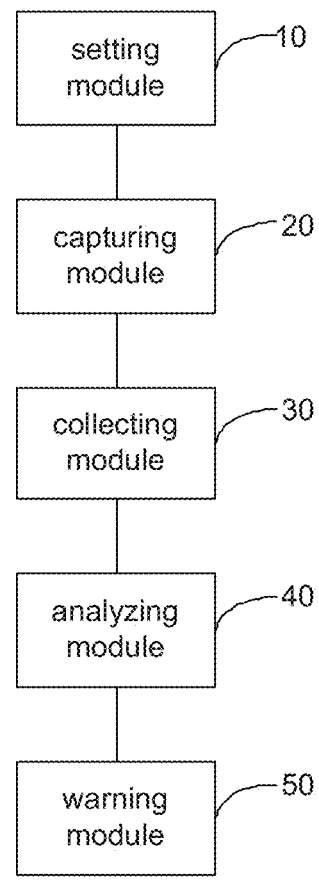
FIG. 5 is a schematic diagram of a structure of a device for monitoring power consumption of an application in an Android terminal according to the disclosure.

With reference to FIG. 5, an embodiment of a device for monitoring power consumption of an application in an Android terminal is proposed. The device includes a capturing module 20, a collecting module 30, and an analyzing module 40. The device may further include a setting module 10 and/or a warning module 50.

The setting module 10 is configured to set a monitor point for capturing a behaviour of an application.

The capturing module 20 is configured to capture the behaviour of the application via a preset monitoring point.

The collecting module 30 is configured to collect data on power consumption of the behaviour of the application.

The analyzing module 40 is configured to analyze the power consumption of the application according to the data on power consumption, and display the result of the analysis on an Android terminal.

The warning module 50 is configured to warn the application meeting a preset warning rule.

Figure 6:
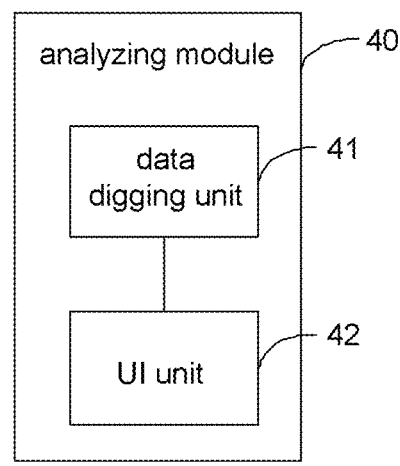
FIG. 6 is a schematic diagram of a structure of an analyzing module in the device for monitoring power consumption of an application in an Android terminal according to the disclosure.

With reference to FIG. 6, the analyzing module 40 includes:

a data digging unit 41 configured to sort and retrieve the data on power consumption; and a UI unit 42 configured to perform statistics on the sorted and retrieved data on power consumption.

Figure 7:
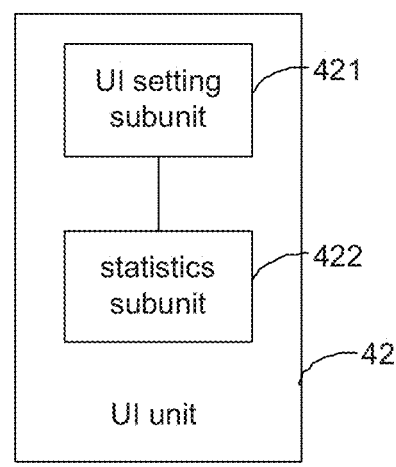
FIG. 7 is a schematic diagram of a structure of a UI unit in the device for monitoring power consumption of an application in an Android terminal according to the disclosure.

With reference to FIG. 7, the UI unit 42 includes:

a UI setting subunit 421 configured to accept a setting for application-power-consumption statistics via a UI; and a statistics subunit 422 configured to perform statistic logic calculation according to the setting.

The device for monitoring power consumption of an application in an Android terminal in the embodiment may be an Android terminal or a device connected to an Android terminal.

The setting module 10 sets each monitoring point. A monitoring point is an underlying data source for monitoring the power consumption of an application, and each monitoring point needs to know the behaviour, PID, and duration of an application being monitored currently. A type of monitoring points mainly serve to monitor CPU occupancy, seizing of a sleep lock, (mobile) phone service, interface-being-on-top, network usage, screen starting, WIFI usage, BT usage, APN usage, and/or GPS usage. As each behaviour monitored by a monitoring point is service logic of a system core, monitoring should be implemented by modifying a code of a framework of an Android system.

The setting module 10 also receives a weight for each monitoring point defined by related R&D personnel according to increase or decrease in a current caused by a behaviour at each monitoring point during an actual development. For example, increase in power consumption due to CPU being in a state of idle or in 100% operation for a period of time, and increase in power consumption due to the system being awake for a long time, are compared with each other, and a greater weight is allocated for a corresponding monitoring point for which ever increase that is greater.

In order for the capturing module 20 to monitor various power-consuming behaviours of an application, some behaviour-capturing codes aiming at the various behaviours are to be placed within the framework of the Android system. As shown in FIG. 2, a specific monitoring point functions as follows.

(1) a PowerManagerService may capture a time point when any application holds or releases a sleep lock, and is a power management service of the Android system; a monitoring point set here may capture the time when each application obtains or releases the sleep lock.

(2) each key service located at a systemserver process is monitored, wherein a MediaPlayerService captures the behaviour of media playing;

a WifiService captures the behaviour of turning on or off the WIFI;

a SettingProvider captures the behaviour of turning on or off the GPS;

a ConnectivityService captures the behaviour of connecting or disconnecting an APN network; and a BluetoothService captures the behaviour of turning on or off the BT.

(3) monitoring is added in a base class used by an application, wherein an OSNetworkSystem.java is a base class for TCP (Transmission Control Protocol) connection of an application, and monitors the network flow of the application; and an Activity.java is a base class for all Activity interfaces of an application, and may monitor display and hide of the application, such that the frequency of foreground usage of the application may be obtained.

(4) a further monitoring point may be an exposed proc port of a Linux operating system /proc/<pid>/stat, which may obtain the time of the CPU being occupied by each application.

The collecting module 30 performs a data collecting service mainly for data preserving and data digging. After a monitoring point is set and required key data are obtained, a unified data reporting interface is required to help each monitoring point send the monitored data into the collecting module 30. As monitoring-point implementing codes are scattered in java files of each corner of the system, in order to allow all data to access the data reporting interface, it is required that a java code of the data reporting interface is implemented in a source code of the framework. As shown in FIG. 2, implemented at pcvalue.java, where the data reporting interface is located, is mainly a port for the following function:

public static boolean InsertPowerConsumptionRecored (Context mRemoteContext, String ComponentName, // name of a monitored application String PkgName, // a package name of the monitored application int PID, // PID of the monitored application int TID, // TID of the monitored application long timeinms, // duration of a monitored behaviour String Action, int args) // the monitored behaviour and a parameter Besides providing one standard interface for connecting each monitoring point to the collecting module 30, the data reporting interface is further required to take care of some performance optimization. A typical demand is to put a reporting request of each monitoring point into a separate thread to queue for execution, such that the request of the monitoring point may be returned immediately so as to avoid any adverse impact on traffic at a UI.

In order to receive, across processes, data from each application process reported via the data reporting interface by each monitoring point, the collecting module 30 may be designed to be a Data Provider, which is one of the basic functions of the Android system; a Data Provider may run in any process and provides a set of data accessing interfaces, which are accessed across processes by another data accessing client via a binder mechanism. In a specific implementation, the collecting module 30 is designed to run in a Systemserver process, and thus will not be limited by a memory management program as running in another general application.

The collecting module 30 consists of sub-modules as follows.

(a) a Data Provider interface: an Android Data Provider works through a series of standard interfaces, which may work with the addition of specific implementation codes, wherein the most important is an insert interface, which receives data sent from the data reporting interface, and included in initialValues are a name, a behaviour, and an operating time of an application, and the like. Implementation of a public Uri insert (Uri uri, ContentValues initialValues) function is to transform the data in the initialValues into an sql instruction for operating the database mentioned below and insert the instruction into a table related to the data.

(b) a database: a built-in data base of the Android system is a lightweight but fully functional database sqlite, which supports standard SQL (Structured Query Language) grammar and is configured here to store data reported from an application; this database establishes a data table for each monitoring point, and data reported by each monitoring point enter a corresponding data table automatically for easy retrieval. The whole database exists in the form of db files, and supports backup and offline access.

(c) a backup service: the database performs a backup in every charging-discharging cycle, wherein a backup file is a db file as a history record for easy query.

The analyzing module 40 analyzes the power consumption of the application according to the aforementioned data on power consumption, wherein specifically, the data digging unit 41 performs data digging; sorting and sophisticated retrieving of data are implemented to reduce the complexity of data analysis at a client; as shown in FIG. 3, the UI unit 42 (UI Classes) indexes data from data in the sqlite via a DataDigHelper; by adding various conditions, various statistical data, such as statistics on monitoring points or applications with heavy power consumptions in a period of time, may be obtained according to the setting at a UI, logic calculation may be implemented, and a simple interface may be exported; the DataDigHelper implements data digging, and dug data are packaged in an AppUsageinfo class;

the UI unit 42 parses the data obtained by the data digging unit 41, and displays the parsed data on a graphical interface; the UI setting subunit 421 provides a visual interface for implementing functions such as statistics of power consumption of each application, detail analysis, and a warning setting; to facilitate the user simplifying the analysis of power consumption of the Android terminal, the UI unit 42 has to support a convenient view for retrieval to facilitate the user finding a program and a service to be forced to stop or to be uninstalled from a list of all programs; in order to enable the user to find an application with too much power consumption timely before battery depletion, this module supports a warning setting by the user, by which the user may set that a warning is given when an application holds the sleep lock continuously for longer than a period of time, or when total power consumption of an application within a period of time exceeds a preset threshold; the above settings may allow the user to filter out some applications which are not commonly used but seriously affect the power consumption according to a practical need; by analysis, the statistics subunit 422 may visually display, before the user, data dug time after time; FIG. 4 illustrates a logic structure for data statistics, wherein an application with abnormal power may be found from multiple perspectives such as in an application mode or in a module mode.

The warning module 50 is a service running in the background, is independent of the UI unit 42, and monitors a system event and a behaviour of an application. A warning option may be set via the UI unit 42, the warning module 50 monitors the behaviour of each application in real time according to the warning setting of the user; once there is a threshold-surpassing behaviour, a warning message is sent to prompt the user to close or uninstall a related application to avoid accidental battery depletion.

In implementation, the warning module 50 may be bundled with a mobile data service or be made as an independent service of the Android system. The warning module mainly provides a monitoring thread in which a condition set via the UI setting subunit 421 by the user is determined, thereby implementing monitoring of different situations. When an abnormal behaviour meeting a warning setting is found, a warning message may be reported to the UI unit 42 by way of intend, and the UI unit 42 is responsible for feedback to the user in the form of a dialog box.

For example, once the user sets to find an application that keeps the system from falling asleep 10 minutes after the mobile entering an idle state, the warning module 50 will keep monitoring an event of screen-going-dark following cease of key-pressing and screen-touching, and will activate a warning program 10 minutes after occurrence of such an event.

For another example, when the user sets to watch for an application with a long-term CPU occupancy of more than 50%, the warning module 50 performs statistics of time of CPU occupancy by each application periodically to find an application occupying the CPU for more than 50% of the time, and report the found application to the UI unit 42.

In this embodiment, by setting a monitoring point, monitoring a behaviour of an application within an Android terminal, and analyzing and processing the monitored data, deterioration in power-consumption performance of the Android terminal caused by application behaviours is controlled effectively, thereby improving user experience.

what described are merely preferable embodiments of the disclosure, and are not intended to limit the scope of the disclosure. All equivalent structures or equivalent flow variations made using content of the specification and accompanying drawings of the disclosure, or direct or indirect application to another related technical field, likewise fall within the scope of the disclosure.

The invention claimed is:

1. A method for monitoring power consumption of an application in an Android terminal, comprising:
  setting a monitoring point for capturing a behavior of an application, the monitoring point being a behavior-capturing code placed within a framework of an Android system;
  receiving a weight for the monitoring point, the weight being defined according to power consumption caused by the behavior monitored by the monitoring point;
  capturing a behavior of an application via the monitoring point, wherein the behavior of the application comprises at least one of CPU occupancy, seizing of a sleep lock, phone service, interface-being-on-top, network usage, screen starting, WIFI usage, Bluetooth (BT) usage, APN usage, media playing, and Global Position System (GPS) usage;
  collecting data on power consumption of the behavior of the application; and
  analyzing the power consumption of the application according to the data on power consumption, and displaying a result of the analysis on an Android terminal,
  wherein the monitoring point is set at a place comprising at least one of:
  a power management service of the Android system to capture a time point when the application holds or releases the sleep lock;
  a key service located at a system server process;
  inside a base class used by the application to capture at least one of a network flow of the application and display-and-hide of the application; and
  an exposed proc port of a Linux operating system to capture a time period of CPU occupancy by the application,
  wherein the key service comprising at least one of:
    a media player service to capture media playing by the application;
    a WIFI service to capture turning on or off WIFI by the application;
    a setting provider to capture turning on or off GPS by the application;
    a connectivity service to capture connecting or disconnecting an APN network by the application; and a BT service to capture turning on or off BT by the application, wherein a unified data reporting interface is coded in a source code of the framework to provide connection of any monitoring point to a data collecting service running in the system server process and to queue a reporting request of the any monitoring point in a separate thread for execution, wherein the collecting data on power consumption of the behavior of the application comprises:

reporting, to the data collecting service via the unified data reporting interface, the data collected by the monitoring point, comprising: a name of the application being monitored; a duration of the behavior being monitored; and the behavior being monitored, wherein the analyzing the power consumption of the application according to the data on power consumption comprises:

accepting a setting for application-power-consumption statistics via a User Interface (UI);

indexing, by UI classes of the data collecting service, the reported data, obtaining, according to the setting at the UI, statistics comprising percentages of power consumption of an application caused respectively by behaviors of the application and percentages of power consumption of applications caused by a behavior of the applications;

sending a warning message of an application; and closing or uninstalling a related application based on the reported data observed.

2. An Android terminal, comprising:

a processor; and a computer-readable storage medium storing an instruction executable by the processor, wherein the processor is configured for:

setting a monitoring point for capturing a behavior of an application, the monitoring point being a behavior-capturing code placed within a framework of an Android system;

receiving a weight for the monitoring point, the weight being defined according to power consumption caused by the behavior monitored by the monitoring point;

capturing a behavior of an application via the monitoring point, wherein the behavior of the application comprises at least one of CPU occupancy, seizing of a sleep lock, phone service, interface-being-on-top, network usage, screen starting, WIFI usage, Bluetooth (BT) usage, APN usage, media playing, and Global Position System (GPS) usage;

collecting data on power consumption of the behavior of the application; and analyzing the power consumption of the application according to the data on power consumption, and displaying a result of the analysis on the Android terminal, wherein the monitoring point is set at a place comprising at least one of:

a power management service of the Android system to capture a time point when the application holds or releases the sleep lock;

a key service located at a system server process;

inside a base class used by the application to capture at least one of a network flow of the application and display-and-hide of the application; and an exposed pros port of a Linux operating system to capture a time period of CPU occupancy by the application, wherein the key service comprising at least one of:

a media player service to capture media playing by the application;

a WIFI service to capture turning on or off WIFI by the application;

a setting provider to capture turning on or off GPS by the application;

a connectivity service to capture connecting or disconnecting an APN network by the application; and a BT service to capture turning on or off BT by the application, wherein a unified data reporting interface is coded in a source code of the framework to provide connection of any monitoring point to a data collecting service running in the system server process and to queue a reporting request of the any monitoring point in a separate thread for execution, wherein the processor is configured for: collecting the data on the power consumption of the behavior of the application by:

reporting, to the data collecting service via the unified data reporting interface, the data collected by the monitoring point, comprising: a name of the application being monitored; a duration of the behavior being monitored; and the behavior being monitored; and analyzing the power consumption of the application according to the data on the power consumption by:

accepting a setting for application-power-consumption statistics via a User Interface (UI);

indexing, by UI classes of the data collecting service, the reported data, obtaining, according to the setting at the UI, statistics comprising percentages of power consumption of an application caused respectively by behaviors of the application and percentages of power consumption of applications caused by a behavior of the applications;

sending a warning message of an application; and closing or uninstalling a related application based on the reported data observed.

* * * * *